United States Patent [19]

Takahashi et al.

[11] Patent Number: 5,528,475

[45] Date of Patent: Jun. 18, 1996

[54] CONTROL CIRCUIT FOR AUTOMOBILE HEADLAMPS EMITTING LIGHT IN VARIABLE COLOR

[75] Inventors: Kazuki Takahashi; Makoto Izawa; Toshihisa Hayami; Hideki Uchida; Takayuki Unno, all of Shizuoka, Japan

[73] Assignee: Koito Manufacturing Co., Ltd., Tokyo, Japan

[21] Appl. No.: 360,091

[22] Filed: Dec. 20, 1994

[30] Foreign Application Priority Data

Dec. 24, 1993 [JP] Japan ................................. 5-345974
Dec. 24, 1993 [JP] Japan ................................. 5-345975

[51] Int. Cl.⁶ ................................................ B60Q 1/00
[52] U.S. Cl. ........................... 362/61; 362/276; 362/802; 362/293; 362/280
[58] Field of Search .......................... 362/61, 276, 293, 362/80, 802, 280, 307, 319; 359/40, 892

[56] References Cited

U.S. PATENT DOCUMENTS

| | | | |
|---|---|---|---|
| 4,951,178 | 8/1990 | Shirai et al. ........................... | 362/62 |
| 5,029,050 | 7/1991 | Bergkvist ............................. | 362/293 X |
| 5,036,437 | 7/1991 | Macks ................................. | 362/293 X |
| 5,251,110 | 10/1993 | Leleve ................................ | 362/293 X |

*Primary Examiner*—Denise L. Gromada
*Assistant Examiner*—Thomas M. Sember
*Attorney, Agent, or Firm*—Fitzpatrick, Cella, Harper & Scinto

[57] ABSTRACT

A control circuit for automobile headlamps which emit light in variable color. The control circuit prevents left and right headlamps from emitting beams of light in different colors. Each headlamp includes a white light bulb, and a yellow globe is moved from a first position to a second position to cover the bulb when yellow light is selected, and the yellow globe is moved back to the first position when white light is selected. If the movement of the globe stops between the first and second positions, the control circuit generates a fault signal for turning off the headlamp associated with the fault, thus preventing the headlamps from emitting light of different colors. Alternatively, the control circuit can adjust the position of the globe for the headlamp without the fault to be in agreement with the position with the headlamp having the fault, such that both headlamps emit light of the same color.

11 Claims, 8 Drawing Sheets

| STATE | INPUT | | OUTPUT | | OUTPUT MODE |
|---|---|---|---|---|---|
| | in1 | in2 | m+ | m− | |
| A | L | H | L | H | REVERSE |
| B | H | L | H | L | FORWARD |
| C | H | H | L | L | BRAKE |

| INPUT | | | | | OUTPUT | |
|---|---|---|---|---|---|---|
| CLR | PR | CK | J | K | Q | Q̄ |
| 0 | 0 | * | * | * | 1 | 1 |
| 0 | 1 | * | * | * | 0 | 1 |
| 1 | 0 | * | * | * | 1 | 0 |
| 1 | 1 | ↧ | 0 | 0 | Q | Q̄ |
| 1 | 1 | ↧ | 1 | 0 | 1 | 0 |
| 1 | 1 | ↧ | 0 | 1 | 0 | 1 |
| 1 | 1 | ↧ | 1 | 1 | Q̄ | Q |
| 1 | 1 | ↥ | * | * | Q | Q̄ |

| V3 | 42a OUTPUT (1) | 42b OUTPUT (2) |
|---|---|---|
| LESS THAN V2 | H | L |
| NOT LESS THAN V2 AND LESS THAN 1 | H | H |
| NOT LESS THAN V1 | L | H |

CONTROL CIRCUIT FOR AUTOMOBILE HEADLAMPS EMITTING LIGHT IN VARIABLE COLOR

BACKGROUND OF THE INVENTION

1. Field of the Invention

The present invention relates to a control circuit for automobile headlamps, such as fog lamps, which emit light in variable color. The control circuit prevents left and right headlamps from emitting beams of light in different colors.

2. Related Background Art

It has hitherto been in practice to use a headlamp emitting a beam of yellow-colored light or a headlamp emitting a beam of white-colored light for an automobile. However, recently a lamp which permits a selection of a desired color for a beam of the emitted light as freely selected from a list of available colors, such as a white color and a yellow color is used. FIG. 9 is a diagram which illustrates the construction of a device capable of controlling a selection of a color for the light emitted from a headlamp. In FIG. 9, the revolution of a motor 80 is transmitted to a worm wheel 87 via a worm gear 81, and a pinion gear 82, which forms a structure unified with the worm wheel 87 and rotates together with the worm wheel 87 in one block.

This revolution of the worm wheel 87 places a rack 83, which is in its engagement with the pinion gear 82, into its straight-line motion. Then, a yellow globe 84, which is set in the upper part of the rack 83, moves forward or backward as one structure with the rack 83. This movement causes the yellow globe 84 to approach a bulb 85 or to move away from it, so that yellow globe 84 covers the bulb 85 when the yellow globe 84 has approached a point nearest to the bulb 85, and a beam of yellow light is therefore emitted. On the other hand, when the yellow globe 84 has moved farthest away from the bulb 85, the light emitted from the bulb 85 is reflected by a reflecting mirror 86 and is projected as a beam of white light.

In this manner, the driving force derived from the motor 80 can be applied so as to make the color of the light emitted from the headlamp either white or yellow.

However, such a prior art device as the one described above is not capable of controlling the color of the light when a fault has occurred in the motor or another part of its driving system because the yellow globe will stop at the location where it presently is when such a trouble occurs. On the other hand, since there are two headlamps, a left lamp and a right lamp, in a system, which performs color control by a synchronized operation, if the driving system for one of the two lamps has a fault, it is not possible for the system to perform any synchronized operation. Accordingly, the left and right headlamps will respectively emit beams of light of a different color, which presents a disadvantage in that it is in itself an undesirable condition from the viewpoint of safety in driving. This is so, because the beams of light projected ahead of the motor vehicle are different in color between the left headlamp and the right headlamp, such a difference in the color of the light beams producing a difference in the visual perception of the distance from objects which the beams of light are projected onto.

SUMMARY OF THE INVENTION

The present invention has been made in view of the above, and it is an object of the present invention to offer a control circuit which, as applied to a pair of automobile headlamps, is capable of eliminating a state in which the left and right headlamps respectively emit beams of light different in color from each other.

In order to overcome the disadvantages described above, according to a first aspect of the present invention, a control circuit is provided which is constructed in such a manner that a fault detecting means provides a fault signal to a light color changing means when the fault detecting means has detected any fault in the operation, for changing the color of light in the beams emitted from the headlamps.

The headlamps are turned OFF when the colored globe of at least one of the headlamps is stopped in any halfway position other than the position where the colored globe is nearest to the bulb or in the position where the colored globe is farthest away from the bulb, and, then, when the control circuit working with the fault detecting means determines that the colored globe is in any position in its course of movement, the fault detecting means will provide a signal indicating the fault, and the bulb will be turned off in response to the signal.

The disadvantages described above may also be overcome according to a second aspect of the present invention wherein a control circuit for a pair of headlamps is provided, which includes: a color selecting switch (7), which makes a selection of a color; a first switch comprising a pair of conductor patterns (8a and 8b, and 8a' and 8b'), one of the conductor patterns being longer than the other, and a short-circuiting piece (9a and 9a') for forming a short-circuit between the two conductor patterns, the first switch being provided at each of the two sides where the headlamps are situated; a second switch (8c, 8d, and 9b, and 8c', 8d', and 9b') formed in a construction identical with that of the first switch and with the shorter conductor pattern being in a different position, the second switch being provided at each of the two sides; a motor driver (3 and 3'), at each of the two sides, and which provides a driving signal in response to a signal transmitted thereto from the first switch or the second switch; a motor (80 and 80'), which is driven by a motor driver provided at both sides; a color globe (84) which is provided at both sides, the position of which is controlled by the motor; and a fault detecting circuit (14a and 14a'), which is driven by the motor, and provides a fault signal indicating a fault to the control circuit for the headlamp at the other side of the pair of headlamps when the state of movement of the globe at either side, has been found to be in fault.

When either of the color globes has stopped halfway in the course of its movement due to the occurrence of a fault, the fault detecting circuit generates a fault signal, by which the signal from the color selecting switch is disabled at the side where the color globe is operating in a faultless state, and the signals respectively generated from the first switch and the second switch in the head lamp circuit at the side where a fault has occurred are provided to the second switch and the first switch at the faultless side, so that the control circuit causes the headlamp at the faultless side to emit a beam of light of the same color as that of the light in the beam emitted from the headlamp at the side where the fault occurred.

DETAILED DESCRIPTION OF THE PREFERRED EMBODIMENTS

Figures 1, 2:
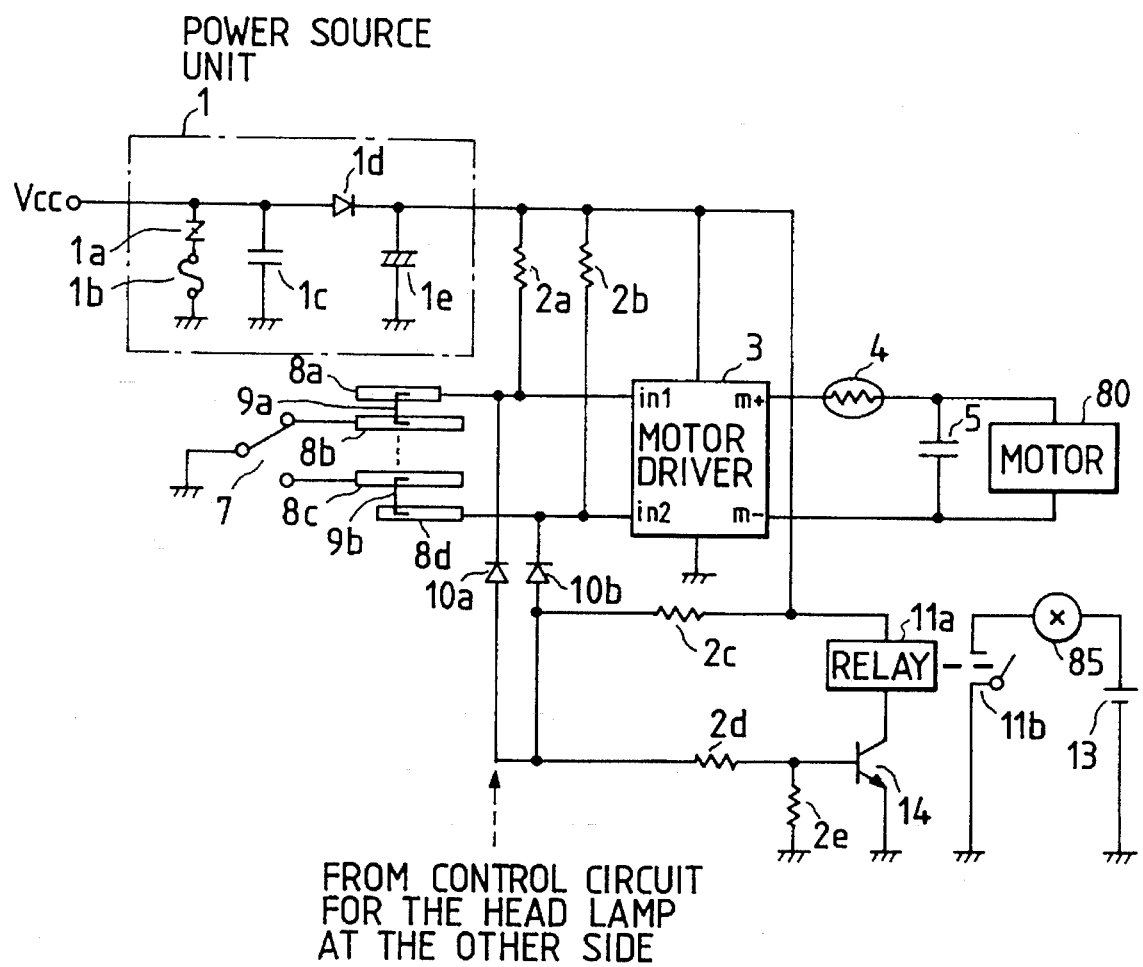
FIG. 1 is a circuit diagram which illustrates the construction of a control circuit in a preferred embodiment of the present invention.
FIG. 2 is a diagram illustrating the operation of the motor driver shown in the circuit of FIG. 1.

FIG. 1 is a circuit diagram illustrating an example of a preferred embodiment of a control circuit which serves as a prerequisite to the present invention, and an electric power source Vcc, which is supplied from an external power source, is connected to the individual components of the control circuit via an electric power source 1, which is composed of a surge absorber 1a, a fuse 1b and capacitors 1c and 1d.

Brushes 9a and 9b are designed so as to move in straight-line motion together with the rack 83, which has been described with reference to FIG. 9, and these brushes 9a and 9b are designed so as to travel freely in the left direction and in the right direction as shown in FIG. 1. The brush 9a is set so as to form a short-circuit between a conductor pattern 8a and a conductor pattern 8b, and the brush 9b is set so as to form a short-circuit between conductor pattern 8c and a conductor pattern 8d. In this regard, the conductor pattern 8a is shorter in length than the conductor pattern 8b, and the left end portions of the conductor pattern 8a and the conductor pattern 8b are arranged so as to be in line with each other at the left side. The conductor pattern 8d is shorter in length than the conductor pattern 8c, and the end portions of the conductor pattern 8b and the conductor pattern 8c are in line with each other at the right end. Further, when it is not necessary to specify the conductor patterns individually, the conductor patterns will be collectively referred to with the reference number 8, and, similarly, the brushes will be collectively referred to with the reference number 9. The conductor patterns 8 may also be referred to as conductors, conductor strips or conductive elements. The conductor patterns 8 and brushes 9 function as a position detecting means, and at least as a part of a fault detecting means.

The brushes 9 are set in a position at the right end or the left end of the conductor patterns 8. It is assumed that the brushes 9 are initially located in a position at the left end of the conductor patterns 8. If a color selecting switch 7 is set in the position shown in FIG. 1 when the brushes 9 are held in the position just described, then, since the conductor patterns 8a and 8b are short-circuited by the brush 9a, the lower end portion of a resistor 2a is grounded, so that the input terminal (in1) at the upper side of a motor driver 3 is set at a low level L. However, since the input terminal (in2) at the lower side of the motor driver 3 is pulled up to Vcc by the resistor 2b, the lower input terminal (in2) is held at a high level H.

The motor driver 3 is constructed in such a manner that its output is determined in accordance with the levels at the two input terminals (in1 and in2), as shown in FIG. 2. When the color selecting switch 7 is set in the position shown in FIG. 1, the motor driver 3 is in the state indicated in row A in FIG. 2, so that the output from the motor driver 3 is set in an output mode, "Reverse". Therefore, the motor 80 rotates in reverse, and, in interlocking with the reverse revolution of the motor, the brushes 9 move to the right end portion of the conductor pattern 8 shown in FIG. 1. When the brushes 9 have completed the move to the right end portion of the conductor patterns 8, the brush 9a no longer remains in contact with the conductor pattern 8a, so that the lower side of the resistor 2a is no longer at ground, and the motor driver 3 is then put in a state in which both the input terminals (in1 and in2) are pulled up to Vcc via resistors 2a and 2b, respectively.

In consequence of this, the motor driver 3 is put in the state shown in the row C in FIG. 2, and the output mode is now "Brake", and both of the terminals of the motor 80 are held at the low level L, and the motor thereby stops its revolution. When the color selecting switch 7 is set at the side opposite to the side shown in FIG. 1 while the motor drive 3 is in the state just described, the motor driver 3 will then be placed in a "Forward" state, and the brushes 9 move to the left end portions of the conductor patterns 8, and stop there.

Figure 9:
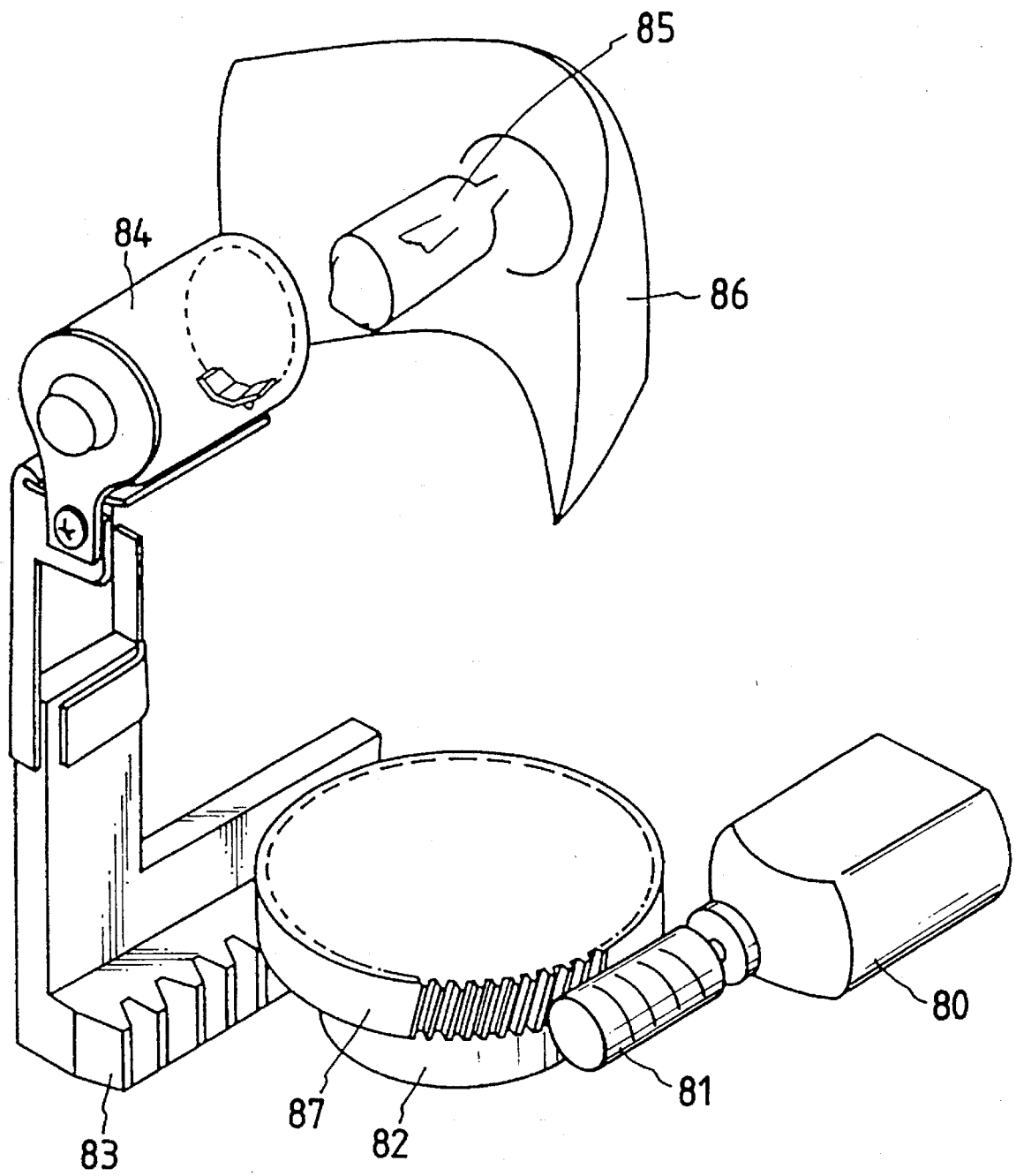
FIG. 9 is a perspective view illustrating an example of a prior art device.

As described above, the yellow globe 84, which is shown in FIG. 9, moves forward and backward with the revolution of the motor 80. Therefore, assuming that the headlamps emit a beam of light in white when the brushes 9 are located at the left end portion of the conductor 8 shown in FIG. 1, the headlamps will emit a beam of light in yellow when the brushes 9 are located at the right end portion of the conductor patterns 8.

The description given above relates to a case in which the brushes 9 are positioned either at the left end portion or the right end portion of the conductor patterns 8 shown in FIG. 1. When the brushes 9 are in the process of movement between the left and right ends of the conductor patterns 8, the left end portion of a resistor 2d is grounded by way of a diode 10a or a diode 10b dependent upon the position of switch 7, so that the base of a NPN transistor 14 is held at the low level L turning transistor 14 OFF, and a relay 11a is de-energized. Consequently, a contact 11b of the relay 11a is opened, and the bulb 85 is turned OFF. Reference marks 2c and 2e denote resistors, reference number 4 denotes a thermistor, reference number 5 denotes a capacitor, and reference number 13 denotes a battery.

Hence, while the brushes 9 are in the process of moving, i.e., while the yellow globe 84 is in the process of its movement, the bulb 85 remains turned OFF due to relay 11a being de-energized. Therefore, even if a fault occurs in the driving system, causing the driving system to stop its operation on the spot, when the brushes 9 are in the process of their movement, the bulb 85 at the side (left or right) where the fault has occurred will not be turned ON, therefore the left and right headlamps will never emit respective beams of light in different colors.

The bulb 85 is provided in both of the left and right headlamps, and it is highly probable that, even if one of the headlamps has a fault affecting its driving system, the other headlamp will not have any such fault. Therefore, the headlamp which is in its normal state will emit a beam of light either in white or in yellow. The description given so far relates to an operation for turning OFF the headlamp which is affected by a fault occurring in the driving system. However, it will be possible to turn OFF both of the headlamps, even in a case in which a fault has occurred to one of the driving circuits, provided that the same point in the lamp control circuit for the headlamp at the other side is connected to the corresponding point in the circuit at the other side as shown by the dotted line in FIG. 1.

In this regard, a wiper switch may also be used as the color selecting switch 7.

Figure 3:
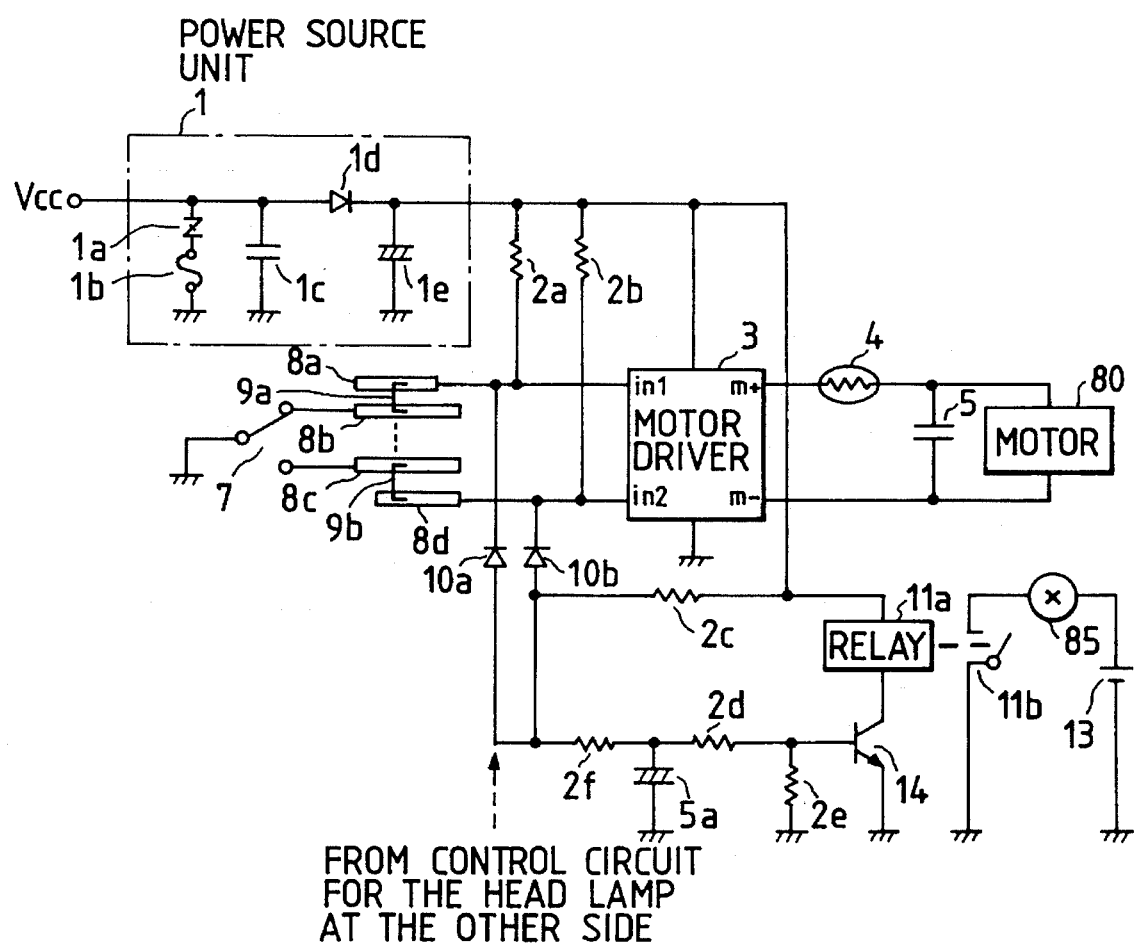
FIG. 3 is a circuit diagram illustrating the construction of another preferred embodiment of the control circuit according to the present invention.

FIG. 1 is a circuit for turning OFF the bulb 85 while the yellow globe 84 is in the process of its movement. FIG. 3 is a circuit which is designed not to turn OFF the headlamp at the time when the color of the light is changed, but to turn OFF the headlamp only when a fault has occurred in the driving system.

In this circuit, a capacitor 5a is charged via a resistor 2c and a resistor 2f when the color of the beam of light is not being changed. Consequently, the base of the transistor 14 is held at the high level H and transistor 14 is turned ON, and the relay 11a is thereby energized. Consequently, the contact 11b of relay 11a is closed and the bulb 85 is maintained ON.

When the color of the light is changed, the left end portion of the resistor 2f is connected to ground via the diode 10a or the diode 10b dependent upon the position of switch 7. However, the base of the transistor 14 is held at the high level H if the discharging time constant of the capacitor 5a and the resistor 2f is kept greater than the period of time up to the point in time when a change of the color of the light is completed. Owing to this feature, the headlamps remain turned ON in the course of a change in the color of the light.

However, when the driving system is stopped halfway in the course of its movement, the left end portion of the resistor 2f remains in the grounded state, so that the electric charge on the capacitor 5a is soon discharged, and the base of the transistor 14 returns to the low level L turning transistor 14 OFF, and the bulb 85 is thereby turned OFF due to relay 11a being de-energized. That is to say, the headlamp is turned OFF when a fault occurs to its driving system.

Moreover, this circuit may also be arranged so as to turn OFF both the headlamps when a fault occurs to the driving system, with the control circuit for the lamp at the other side being connected to this control circuit as indicated by the dotted line in FIG. 3.

Figure 4:
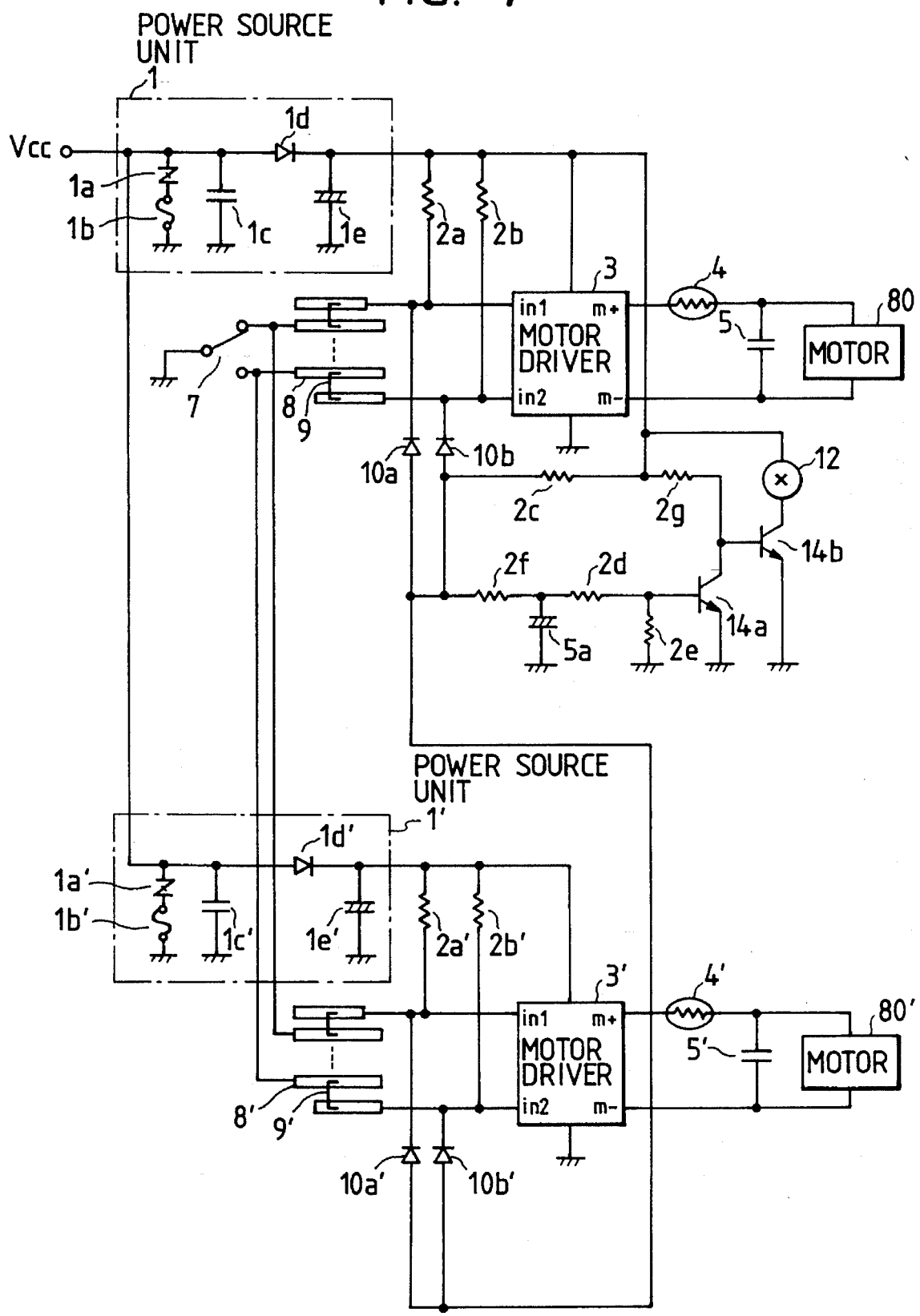
FIG. 4 is a circuit diagram illustrating the construction of still another preferred embodiment of the control circuit according to the present invention.

FIG. 4 is a circuit diagram illustrating a circuit for turning ON an indicator lamp when a fault occurs to the system. In FIG. 4, a transistor 14a is turned ON when no fault is present in the driving system as explained above. Thus, a NPN transistor 14b is turned OFF due to its base being at a low level L, and an indicator lamp 12 is turned OFF due to transistor 14 being OFF.

When any fault occurs to the driving system, the transistor 14a is turned OFF as explained above. Thus, the transistor 14b is turned ON due to its base being at a high level H, and the indicator lamp 12, which indicates a fault, is turned ON due to transistor 14b being turned ON.

The description given above is a general description relating to a headlamp which changes the color of its light.

Figure 5:
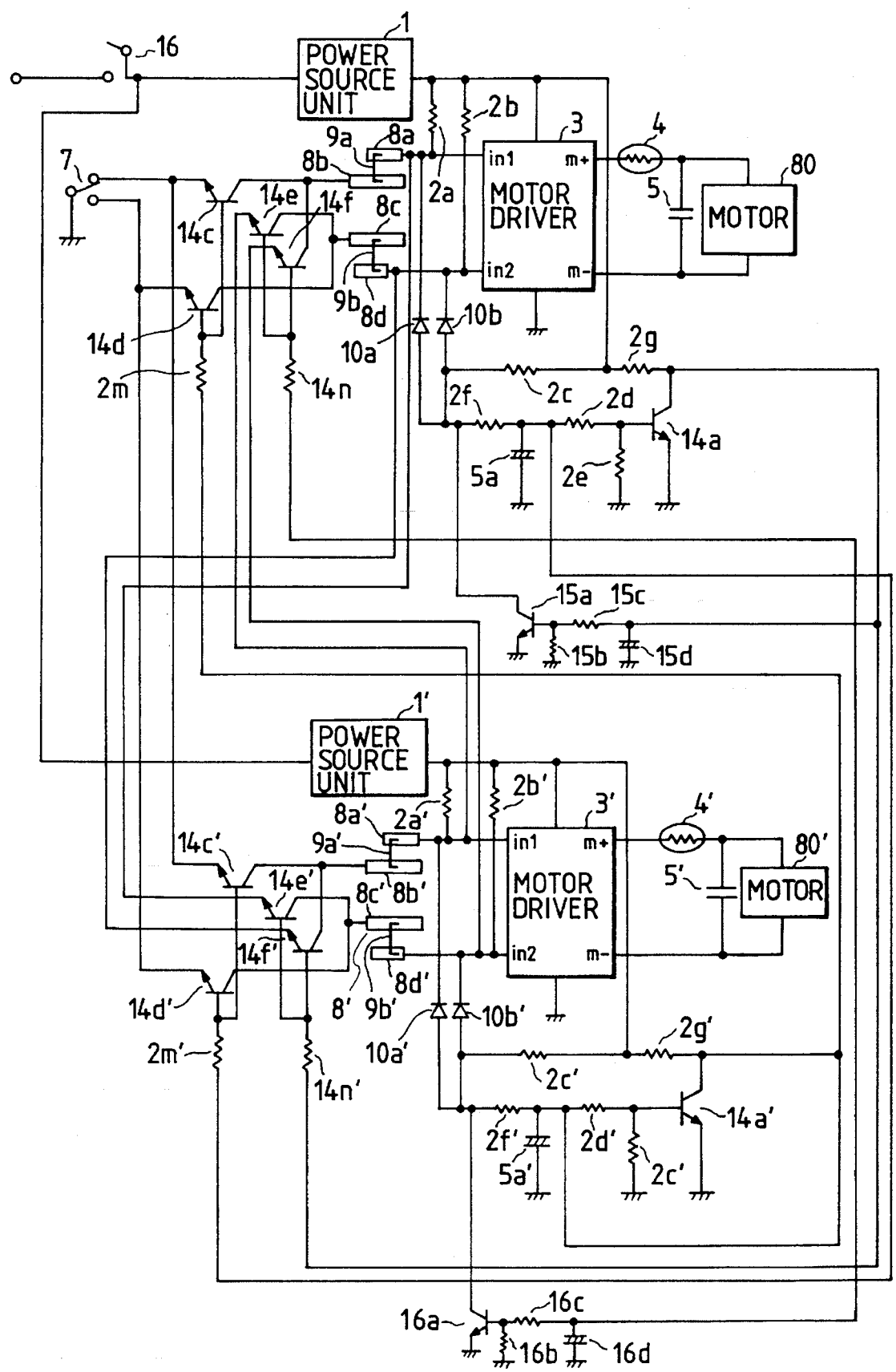
FIG. 5 is a circuit diagram illustrating the construction of still another preferred embodiment of the control circuit according to the present invention.

FIG. 5 is a circuit diagram illustrating an example of an application of the present invention, which is formed in a construction designed to adjust the color of the light from the normal headlamp in such a manner that the color of the light is kept in agreement with the color of the light emitted from the headlamp which has been affected by a fault occurring to its driving system when one of the pair of headlamps has developed a fault in its control operation. The control system is constructed in such a manner that the brushes 9a and 9b and the brushes 9a' and 9b' will be located at the right end portion or the left end portion of the conductor patterns 8a, 8b, 8c, and 8d and the conductor patterns 8a', 8b', 8c' and 8d' when the system is operating in a normal state. Now, it is assumed that the brushes 9a and 9b and the brushes 9a' and 9b' are positioned at the left end portion of the conductor patterns 8 and 8', respectively.

When the brushes 9 and 9' are positioned at the left end portion of the conductor patterns 8 and 8', neither of the input terminals (in1 and in2) of the motor drivers 3 and 3' are grounded, so that signals at the high level H are provided to the bases of the transistors 14a and 14a', turning these transistors ON. Thus, transistors 14e, 14f, 14e', and 14f' are turned OFF due to their bases being at a low level L as a result of transistors 14a and 14a' being turned ON. Since the bases of the transistors 14a and 14a' are kept at the high level H, the transistors 14c, 14d, 14c' and 14d' are turned ON since their bases are likewise at the high level H.

Here, when the color selecting switch 7 is set for the selection of the direction opposite to that shown FIG. 5, the lower sides of the input terminals of the motor drivers 3 and 3' are connected to the ground via the turned on transistors 14d and 14d', so that the motors 80 and 80' are set into their revolution as described above, and the color of the light emitted from the lamp is changed. It is just as described above that the operating states of the transistors 14a and 14a' are not changed while the motors are revolving when the driving system is in its normal state. It is also as just described above that the brushes 9 are to be positioned at the right end portion of the conductor patterns 8 when a change has been made in the color of the light emitted from the headlamp, that both of the input terminals of the motor drivers 3 and 3' are changed to the high level H at such a time, and that the color of the light emitted from the headlamp will be changed again when the position of the color selecting switch 7 is changed.

Here, it is assumed that the driving system at the upper side of FIG. 5, for example, has developed a fault, remaining stopped at the left end portion of the conductor patterns 8, when the brushes 9 move towards the right. At such a time, the terminal voltage of the capacitor 5a will be at the low level L after its holding time, and the transistors 14c' and 14d', which have been ON, are turned OFF due to their bases being at the low level L. Also, a signal at the low level L is provided to the base of transistor 14a, which is thereby turned OFF, so that the transistors 14e' and 14f' are turned ON due to their bases being at the high level L.

Then, the same signal that is provided to the input terminal (in1) of the motor driver 3 at the upper side of FIG. 5 is provided to the input terminal (in2) of the motor driver 3' at the lower side of FIG. 5. In the same manner, the same signal that is provided to the input terminal (in2) of the motor driver 3 at the upper side is provided to the input terminal (in 1) at the lower side. Consequently, the brush 9', which has moved to the right end portion of the conductor pattern 8' at the lower side has such an effect that the signal opposite to that in the position of the switch 7 is provided to the motor driver 3' at the lower side. By this operation, the brush 9' moves to the left end portion of the conductor patterns 8', just as at the upper side at which the brush 9 is stopping at the left end portion of the conductor patterns 8, and the color of the light emitted from both of the lamps becomes the same.

Further, as the transistor 14a is turned OFF, the transistor 15a is turned ON due to its base being at the high level L. Therefore, the terminal voltage of the capacitor 5a is fixed at the low level L due to the transistor 15a being turned ON, by which the state of the capacitor 5a and the state of the transistor 14a will be securely maintained as they are, even if the color selecting switch 7 is operated at any subsequent time, so that the color of the light emitted from the headlamp does not change.

Capacitors 15d and 16d and resistors 15c and 16c form a delay circuit which prevents the transistors 15a and 16a from being turned ON while the capacitors 5a and 5a' are being charged when electric power is initially supplied from the power sources 1 and 1', respectively.

Figure 6:
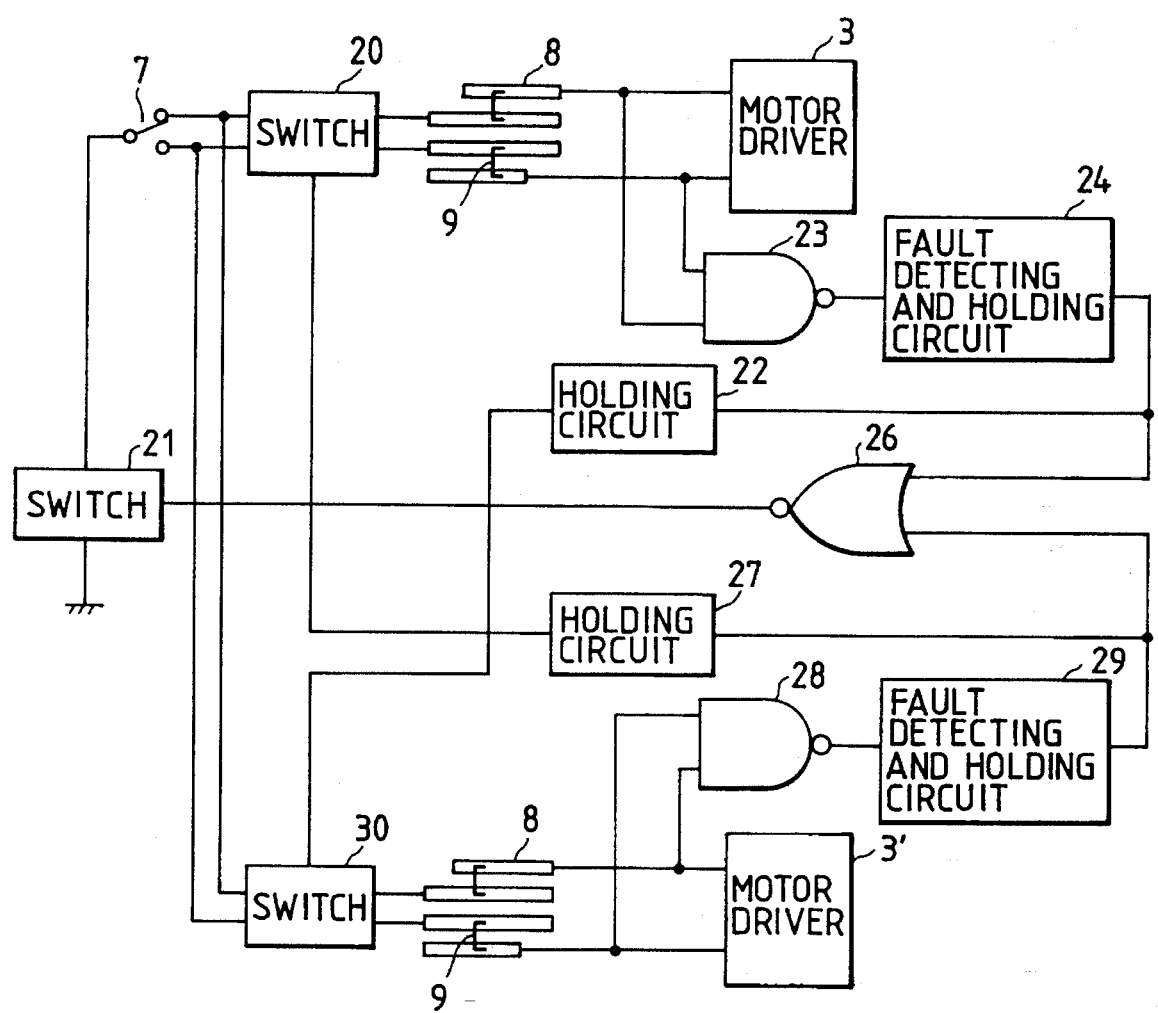
FIG. 6 is a block diagram illustrating the construction of still another preferred embodiment of the control circuit according to the present invention.
Figures 7A, 7B:
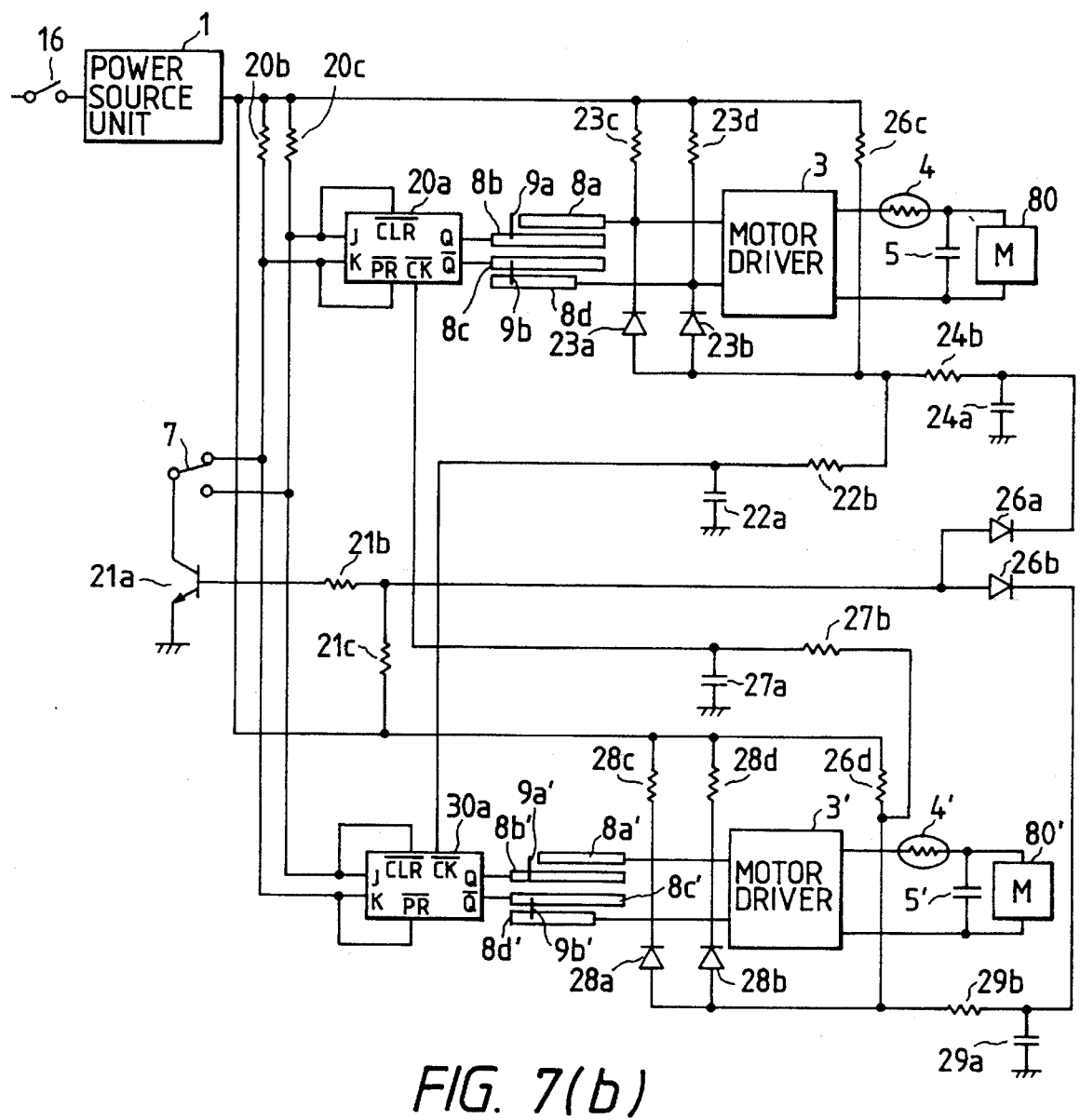
FIG. 7(a) is a circuit diagram illustrating the details of the circuit illustrated in the block diagram of FIG. 6.
FIG. 7(b) is a truth table used for describing the operation of flip-flops 20a and 30a of FIG. 7(a)

FIG. 6 is a block diagram of another preferred embodiment of the control circuit of the present invention. FIG. 7(a) is a detailed circuit diagram illustrating the details of FIG. 6, and FIG. 7(b) is a logical truth table for describing the operation of the JK flip-flops 20a and 30a of FIG. 7(a).

This circuit is constructed in such a manner that, when a fault has occurred to the driving system, the input terminals of at least one of the motor drivers 3 or 3' remains at the low level L, fault detecting and holding circuits 22 and 24, or 27 and 29, detect and hold such a state by way of an OR circuit 23 or 28. The state thus held is provided to switches 20, 21, and 30, and this circuit prevents the light from the headlamp from undergoing a change in color, even if the color selecting switch 7 is operated at any time subsequent to such a fault detection and such a hold.

In FIG. 7(a), the switch 20 is composed of a JK flip-flop 20a and resistors 20b and 20c. The switch 21 is composed of a transistor 21a and resistors 21b and 21c. The holding circuit 22 is composed of a capacitor 22a and a resistor 22b. The OR circuit 23 is composed of a diode 23a and a diode 23b and resistors 23c and 23d. The fault detecting and holding circuit 24 is composed of a capacitor 24a and a resistor 24b. The OR circuit 26 is composed of diodes 26a and 26b and resistors 26c and 26d. The holding circuit 27 is composed of a capacitor 27a and a resistor 17b.

The OR circuit 28 is composed of diodes 28a and 28b and resistors 28c and 28d. The fault detecting and holding circuit 29 is composed of a capacitor 29a and a resistor 29b. The switch 30 is composed of a JK flip-flop.

In a device constructed in the manner just described, the switch 7 is in the state set in the selected position as shown in FIG. 7(a), and the brushes 9 are positioned at the left end portion of conductor patterns 8.

Here, it is assumed that there occurs a state in which the brushes 9 remain stopped at the left end portion of the conductor patterns 8, with a fault occurring to the driving system mentioned above when the color selecting switch 7 is set, for example, to the opposite side as selected in this instance. At such a time, the terminal voltage of the capacitor 24a will be at the low level L after its holding time, and, consequently, the transistor 21a will be turned OFF due to its base being at the low level L. Then, the switch 7 is rendered ineffective, as it is no longer connected to ground due to transistor 21a being OFF, and both the inputs to the flip-flops 20a and 30a are set at the high level H from power source unit 1 via resistors 20b and 20c.

In the same way, the terminal voltage of the capacitor 22a is set at the low level L after its holding time (which is somewhat longer than the time held by the capacitor 24a).

Then, the voltage of the CK bar terminal of the flip-flop 30a shifts from the high level H to the low level L. Therefore, all the inputs of the flip-flop 30a are at the high level H, and, accordingly, the output will be in a reversed value of that in the previous state. At this time, the driving system at the lower side operates in a normal manner, and the brushes 9' are positioned at the right end portion of the conductor patterns 8', so that the brushes 9' move toward the left end portion of the patterns 8', causing the beams of light from the two headlamps to be emitted in the same color.

Next, since the transistor 21a is in the OFF-state, the level at which signals are applied to the flip-flops 20a and 30a do not change even if the color selecting switch 7 is operated. Therefore, the beams of light emitted from the two headlamps will not be in different colors.

Figures 8A, 8B:
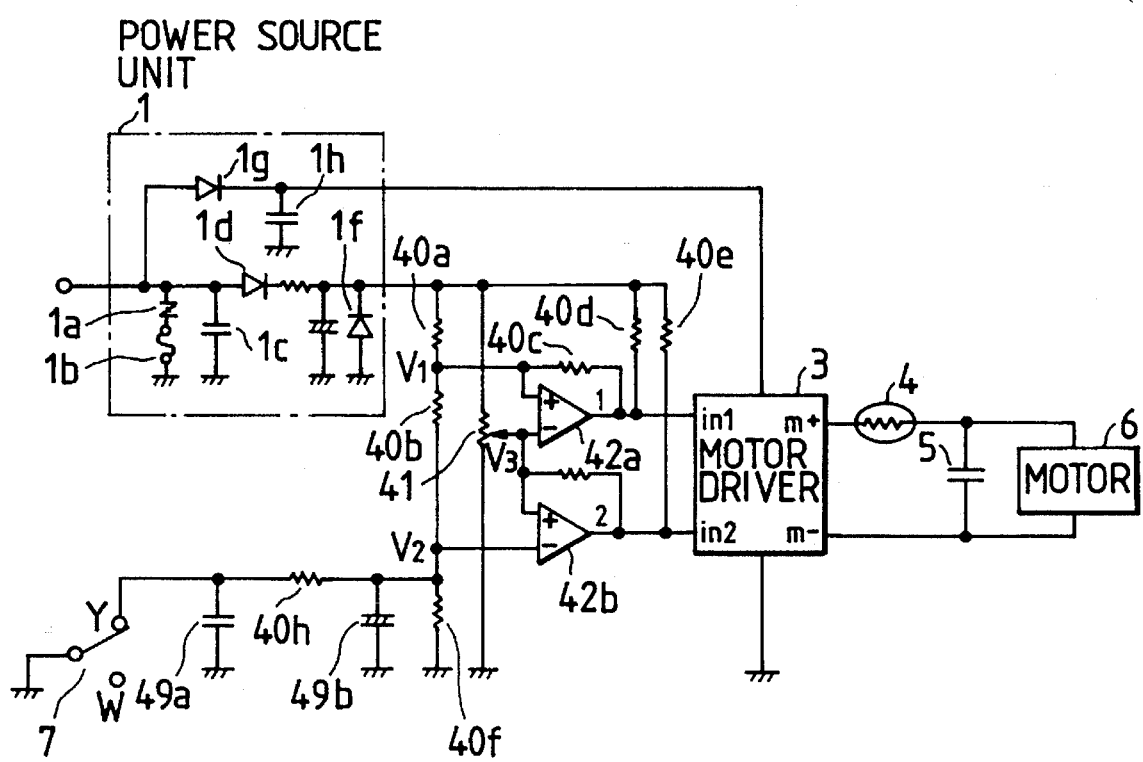
FIG. 8(a) is a circuit diagram illustrating the construction of another preferred embodiment of the control circuit according to the present invention.
FIG. 8(b) is a truth table used for describing the operation of comparators 42a and 42b of FIG. 8(a)

FIG. 8(a) is a circuit diagram illustrating still another example of a preferred embodiment. In the circuits shown in the drawings up to FIGS. 7(a) and 7(b), the conductor patterns 8 and the brushes 9 are used for making a selection of the direction for a color selecting operation. However, the circuit in this example is formed in such a manner that the stopping position is determined by a change made in a circuit constant by the use of a variable resistor 41.

A circuit composed of window comparators 42a and 42b operates according to the logic shown in the truth table of FIG. 8(b). When the color selecting switch 7 is turned to the white color side (i.e., the side not conductive to the ground), the inputs (in1 and in2) to the motor driver 3 are at "H" and "L", respectively, when the voltage V3 indicated on a potentiometer 41 is less than the voltage V2, the motor thereby being placed into clockwise revolution. However, when the potentiometer voltage V3 is not any lower than the voltage V1, the inputs (in1 and in2) to the motor driver 3 are at "L" and "H" respectively, the motor thereby being placed into a counterclockwise revolution, and, when the potentiometer voltage V3 is at a level higher than the voltage V2 and less than V1 (the position in which the yellow globe covers the bulb, turning the color of the beam of light from the headlamp into yellow), the inputs (in1 and in2) of the motor driver 3 are at "H" and "H", respectively, and the motor is stopped with braking applied to it.

When the color selecting switch 7 is shifted to the yellow color side (i.e., the side conductive to the ground), a composite resistor, which is composed of resistors 40a, 40b, 40f, and 40h, determines the voltages V1 and V2, so that the voltage rises higher as compared with the case in which the color selecting switch 7 is turned to the white color side, and, when the voltage is at a value above the voltage V2 but below V1, the yellow globe moves away from the bulb, so that the voltage will be in the range of the potentiometer voltage V3, in which the color of the beam of light from the headlamp will be white. Then, by the same principle as that used when the color selecting switch 7 is turned to the white color side, the control circuit performs control operations on the motor, and the color of the beam of light from the headlamp is changed to yellow.

As described hereinabove, the present invention offers a control circuit which is capable of producing the advantageous effect of preventing a state in which the beams of light emitted from the left and right headlamps are in different colors when any fault has occurred to the driving system. This is possible because the present invention includes a control circuit in which the fault detecting means provides a fault signal to the light color changing means when the fault detecting means has detected any fault in changing the color of the light emitted from either of the headlamps, so that the headlamp can be turned OFF when the colored globe of at least one of the headlamps is either in the position where the colored globe is brought to a point nearest to the bulb or in the position where the colored globe is farthest away from the bulb or so that the control circuit can adjust the position of the colored globe for the headlamp in the normal state so as to be in agreement with the position of the colored globe for the headlamp affected by the fault.

What is claimed is:

1. A control circuit for headlamps emitting light in variable color, and which are capable of changing a color of beams of light emitted from a pair of left and right headlamps, comprising:

light color changing means for changing the color of the beams of light emitted from the pair of headlamps; and fault detecting means for detecting the occurrence of a fault in either of the headlamps when said light color changing means is changing the color of light to be emitted from said pair of headlamps, including means for providing a fault signal to said light color changing means.

2. The combination claimed in claim 1, wherein said light color changing means turns OFF one of the right and left headlamps in response to the provision of the fault signal.

3. The combination claimed in claim 1, including:

a fault lamp, including means for turning on said fault lamp in response to the provision of the fault signal.

4. The combination claimed in claim 2, including:

a fault lamp, including means for turning on said fault lamp in response to the provision of the fault signal.

5. A control circuit for left and right headlamps of an automobile, which emit light in either of two colors, comprising:

light color changing means for changing the color of light emitted from the headlamps from one color to another color;

fault detecting means for detecting a fault in either of the headlamps when said light changing means is in a process of changing the color of light, and for providing a fault signal to said light color changing means for turning OFF the one of the first and second headlamps associated with the detected fault.

6. A control circuit for left and right headlamps of an automobile which emit light in either of two colors, comprising:

a color selecting switch for selecting one of the two colors;

color changing means for changing the color of the light to be emitted from the headlamps in accordance with the selection made by said color selecting switch;

fault detecting means for detecting a fault in either of the headlamps when said color changing means is changing the color of the light to be emitted, and for generating a fault signal; and a switch means responsive to the fault signal for turning OFF the one of the right and left headlamps associated with the detected fault.

7. A control circuit for left and right headlamps of an automobile which emit light in either of two colors, comprising:

a light bulb, in each headlamp, which emits white light;

a motor, associated with each headlamp, having a gear mechanism including a rack on which a colored globe is mounted in axial alignment with said light bulb, the rack being constrained to move between first and second positions, with the globe covering the bulb when the rack is in the first position such that the headlamp emits colored light, with the globe not covering the bulb when in the second position such that the headlamp emits white light;

a motor control circuit, associated with each headlamp, for controlling said motor for moving the rack;

color selection means for providing a first control signal to instruct said motor control circuit to move the rack to the first position when selecting colored light, and for providing a second control signal to instruct said motor control circuit to move the rack to the second position when selecting white light; and fault detecting means for detecting the rack associated with either of the headlamps stopping at a position different than instructed by the first or second control signal, and for generating a fault signal.

8. The combination claimed in claim 7, including:

switch means for turning said light bulb OFF in response to the provision of the fault signal.

9. The combination claimed in claim 7, wherein said motor control for a headlamp without a fault controls said motor to move the rack to a position corresponding to the position of the rack of the headlamp with a fault, in response to the provision of the fault signal.

10. A control circuit for left and right headlamps of an automobile, which emit light in either of first and second colors, comprising:

light color changing means for changing the color of the beams of light emitted from the pair of headlamps to a changed color from the first color to the second color, and vice versa; and fault detecting means for detecting a fault when either of the headlamps emits a beam of light of a different color than the changed color, and for generating a fault signal, wherein said light color changing means changes the color of the light emitted from a headlamp, without a fault, to the light of a different color in response to the generation of the fault signal.

11. A control circuit for left and right headlamps of an automobile, which emit light in either of two colors, comprising:

a light bulb, in each headlamp, which emits white light;

a position control mechanism on which is mounted a colored globe in axial alignment with said light bulb, the position control mechanism being constrained to move between first and second positions in response to a control signal, with the globe covering the bulb when the position control mechanism is in the first position such that the headlamp emits colored light, with the globe not covering the bulb when in the second position such that the headlamp emits white light;

color selection means for providing the control signal to instruct said position control mechanism to move to the first position when selecting colored light, and to move to the second position when selecting white light;

fault detecting means for detecting a fault when said position control mechanism stops at a position different than instructed by the control signal, and for generating a fault signal; and means responsive to the fault signal for controlling said position control mechanism of a headlamp without a fault to move to a position corresponding to the position where the headlamp with a fault stopped.

* * * * *

UNITED STATES PATENT AND TRADEMARK OFFICE
CERTIFICATE OF CORRECTION

PATENT NO. : 5,528,475

DATED : June 18, 1996

INVENTORS : KAZUKI TAKAHASHI ET AL.

It is certified that error appears in the above-identified patent and that said Letters Patent is hereby corrected as shown below:

COLUMN 9

Line 10, "are" should read --is--;
Line 36, "color;" should read --color; and--.

Signed and Sealed this

Twenty-fourth Day of December, 1996

Attest:

BRUCE LEHMAN

*Attesting Officer*    *Commissioner of Patents and Trademarks*